United States Patent [19]

Tomizawa et al.

[11] 3,819,065

[45] June 25, 1974

[54] VESSEL UNLOADER

[75] Inventors: Michishige Tomizawa, Tokyo;
Hirobumi Akizuki, Yokohama, both of Japan

[73] Assignee: Ishikawajima-Harima Jukogyo Kabushiki Kaisha, Tokyo-to, Japan

[22] Filed: Sept. 7, 1972

[21] Appl. No.: 287,208

Related U.S. Application Data

[63] Continuation of Ser. No. 43,472, June 4, 1970, abandoned.

[30] Foreign Application Priority Data

| June 7, 1969 | Japan | 44-52823 |
| June 21, 1969 | Japan | 44-58731 |
| June 21, 1969 | Japan | 44-58732 |

[52] U.S. Cl. .................................. 214/14, 214/15 E
[51] Int. Cl. .......................................... B65g 63/00
[58] Field of Search ........... 214/14, 15, 15 E, 15 D, 214/44 A; 198/174

[56] References Cited
UNITED STATES PATENTS

| 1,233,308 | 7/1917 | Burgess | 214/17 DB |
| 3,107,795 | 10/1963 | Young et al. | 214/14 |
| 3,111,216 | 11/1963 | Geberin | 198/174 |
| 3,349,892 | 10/1967 | Barre | 198/91 |
| 3,387,721 | 6/1968 | Ludwig | 214/14 |

FOREIGN PATENTS OR APPLICATIONS

| 33,404 | 8/1934 | Netherlands | 214/14 |

*Primary Examiner*—Frank E. Werner
*Attorney, Agent, or Firm*—Albert C. Nolte, Jr.; Edward B. Hunter; C. Bruce Hamburg

[57] ABSTRACT

An unloader in which from an unloader structure is suspended a scoop apparatus in such a manner that the apparatus may rotate in the direction at a right angle relative to the longitudinal axis of a bulk material carrying vessel and move along said longitudinal axis.

7 Claims, 19 Drawing Figures

MICHISHIGE TOMIZAWA
HIROBUMI AKIZUKI
INVENTORS

BY *Nolte & Nolte*
ATTORNEYS

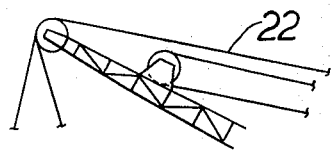
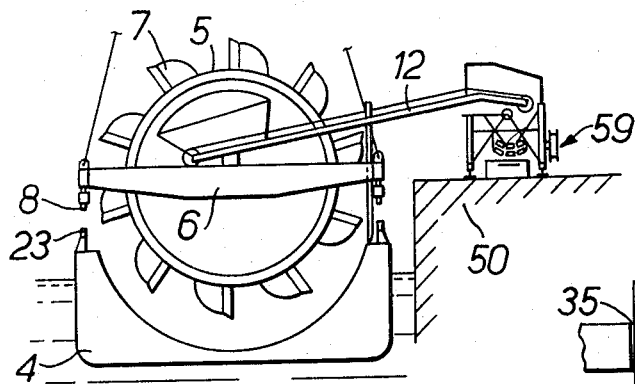
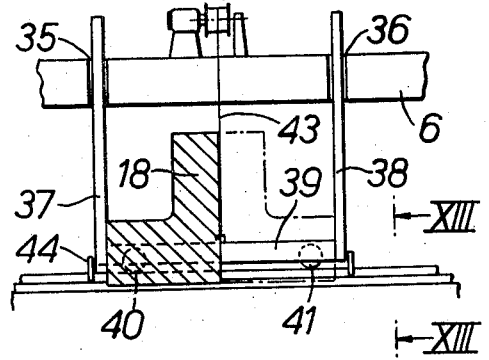
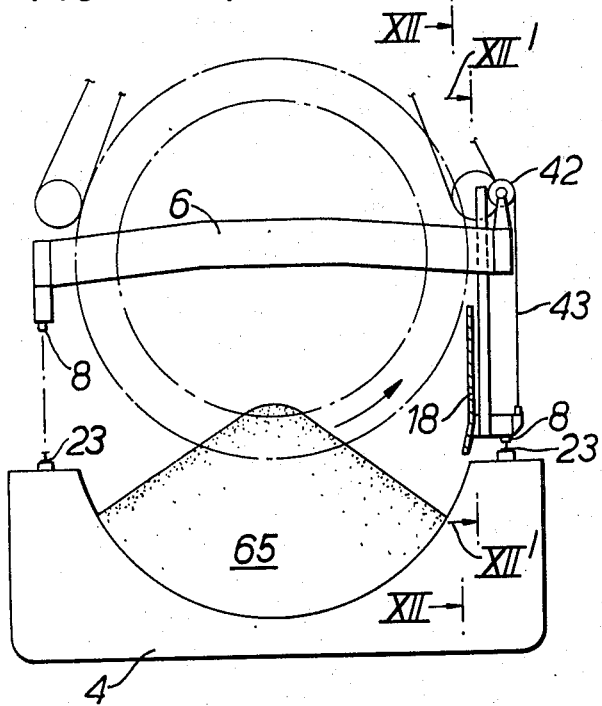
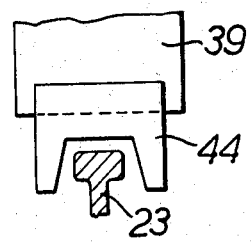

PATENTED JUN 25 1974 3,819,065
FIG. 14.
FIG. 15.
FIG. 16.
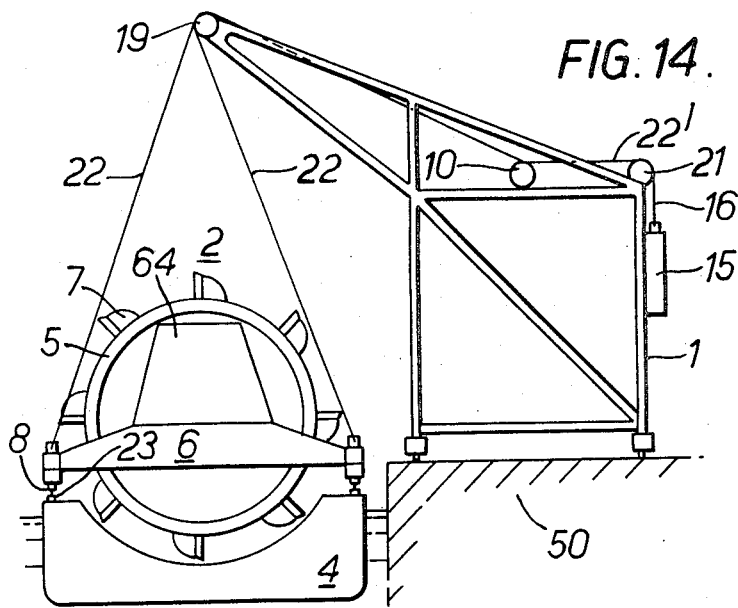
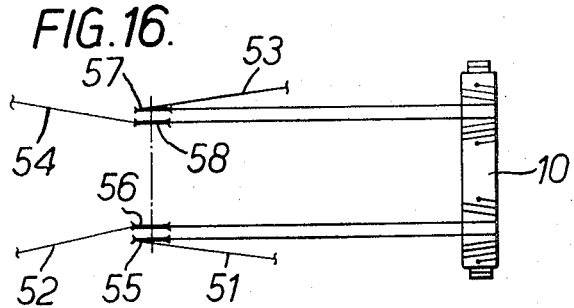
MICHISHIGE TOMIZAWA
HIROBUMI AKIZUKI
INVENTORS
BY Nolte & Nolte
ATTORNEYS 3,819,065

VESSEL UNLOADER

This is a continuation of application Ser. No. 43,472 filed June 4, 1970, now abandoned.

DETAILED EXPLANATION OF THE INVENTION

The present invention relates to generally an unloading machinery and more particularly a vessel unloader. When the bulk materials are unloaded from a vessel or barge, grab buckets are generally widely used. But the continuous vessel-unloading machinery are recently used to meet the demand for increasing the unloading capacity and efficiency. The unloading machinery carrying a bucket wheel or bucket elevator is installed upon a wharf or vessel. When the unloading machinery is installed upon the wharf, the position of the bucket wheel or bucket elevator relative to the vessel or barge is varied because of rolling, trim and so on of the vessel and of the tide so that the unloading operation is adversely affected. When the unloading machinery is installed upon the vessel, the position of the discharge end of the unloading machinery upon the vessel to the loading end of the conveyor on the wharf side is always varied because of the rolling, trim and so on of the vessel and of the tide. Furthermore, since the unloading machinery is installed upon the vessel, the load of the vessel must be reduced and every vessel must have an unloading machine.

When the bucket wheel or bucket elevator is used in unloading, it scrapes the bulk materials in the longitudinal direction of the vessel only in the going run. No scraping is made in the return run. Thus, it takes a long time for accomplishing the unloading and it is very difficult to unload all of the bulk materials smoothly.

It is therefore one of the objects of the present invention to provide a bucket wheel or bucket elevator type unloader which can accomplish the unloading of the bulk materials in a very efficient manner.

It is another object of the present invention to provide an unloader of the character described which can carry out the unloading irrespective of the rolling, trim and so on of the vessel and of the tides.

It is a further object of the present invention to eliminate the defects encountered in an unloader having a scoop apparatus mounted upon a vessel moored alongside the wharf.

It is a further object of the present invention to provide an unlaoder which can sufficiently resist the reaction force caused by scraping of the bulk materials without providing special links or wire ropes for this purpose.

An unloader in accordance of the present invention has a fundamental structural feature that a frame for supporting a scoop apparatus such as bucket wheel or bucket elevator is vertically movably lifted from the leading end of an unloader structure and said scoop apparatus is rotated in the direction at a right angle relative to the longitudinal axis of a vessel carrying bulk materials and is displaced along said longitudinal axis.

The unloader of the character described above can have in combination the following machines, equipments, mechanisms, etc. (a) A harrow which reciprocates or swings in the direction at a right angle relative to the direction of the advancement of the scoop apparatus and slantingly, forwardly thereof; (b) a guard plate vertically movably installed between the scraping and hoisting side of the scoop apparatus and the vessel for preventing the spillage of bulk materials; (c) a weight for reducing the load acting from the scoop apparatus upon the vessel; (d) hoisting wire ropes fixed to the scoop apparatus supporting frame extended in such a manner that they form triangles together with the supporting frame; (e) a shoot interposed between the discharge or unloading end of a front conveyor whose loading end is pivotably fixed to the scoop apparatus and the loading end of a rear conveyor which is installed in a conveyor frame; and (f) a rod having a hydraulic cylinder for connecting the unloader structure with the scoop apparatus.

The present invention will become more apparent from the following description of preferred illustrative embodiments thereof taken in conjunction with the accompanying drawing in which:

FIG. 10 is a front view illustrating the relation among a vessel such as a barge, the scoop apparatus, a crane for hoisting the scoop apparatus, a conveyor and a hopper car;

FIG. 11 is a front view for explanation how the scoop apparatus is guided so as to ride upon the rails upon the barge;

Figure 1:
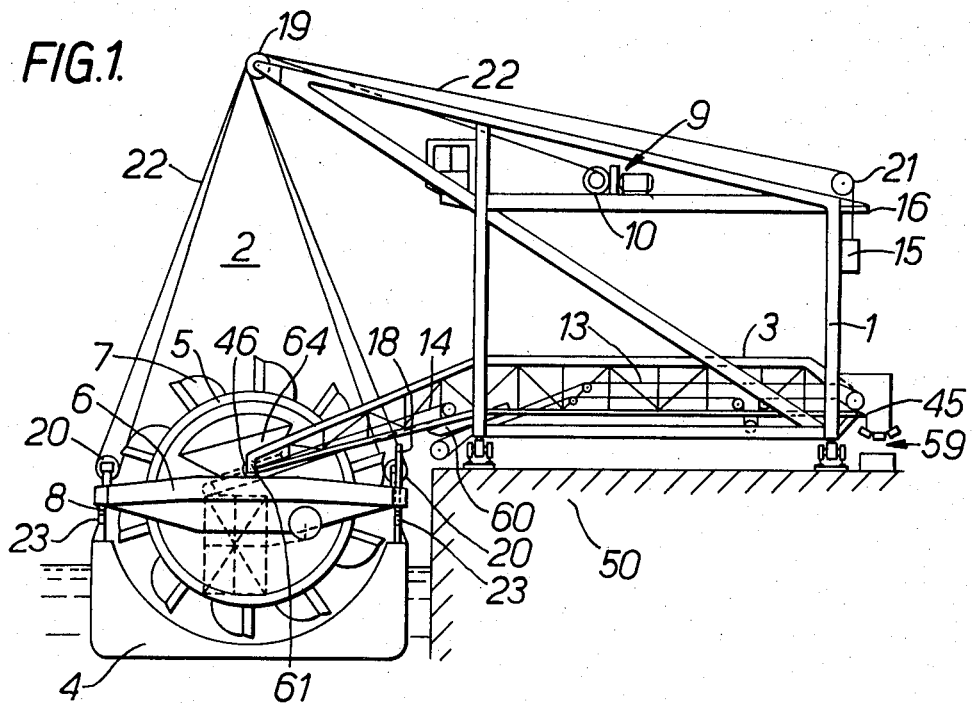
FIGS. 1 and 2 are front views illustrating the relation between an unloader in accordance with the present invention and a vessel.
Figure 17:
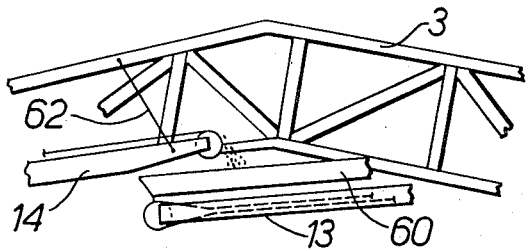
Figure 18:
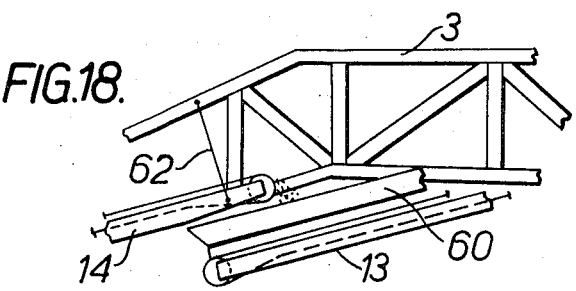

FIG. 12 left half is a view looking at the direction indicated by the arrows XII—XII of FIG. 11, and right half is a view looking at the direction indicated by the arrows XII'—XII' of FIG. 11;

FIG. 13 is a view looking at the direction indicated by the arrows XIII—XIII;

FIG. 14 is a front view illustrating another example of a method for hoisting a weight which is employed to reduce the load of th scoop apparatus acting upon the vessel;

FIG. 15 is a front view illustrating one hoisting method for the unloader in accordance with the present invention;

FIG. 16 is a plane view looking at the direction indicated by the arrow XVI of FIG. 15;

FIG. 17 is an enlarged view of one portion of FIG. 1 illustrating the relative position between the front and rear conveyors under one condition;

FIG. 18 is a view similar to FIG. 17 but under another condition; and

Figure 2:
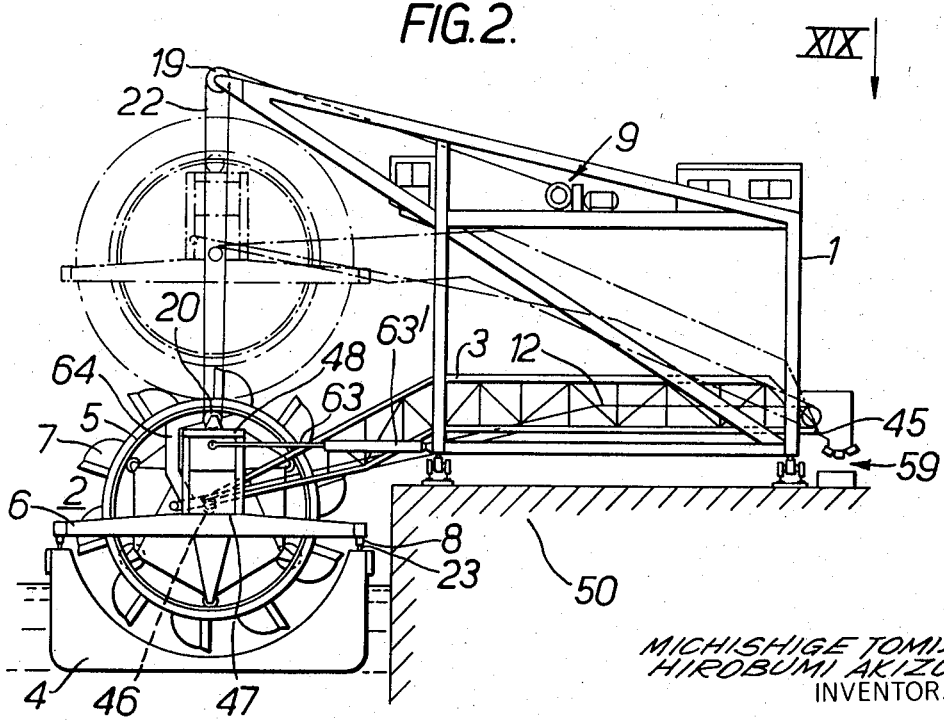
Figure 19:
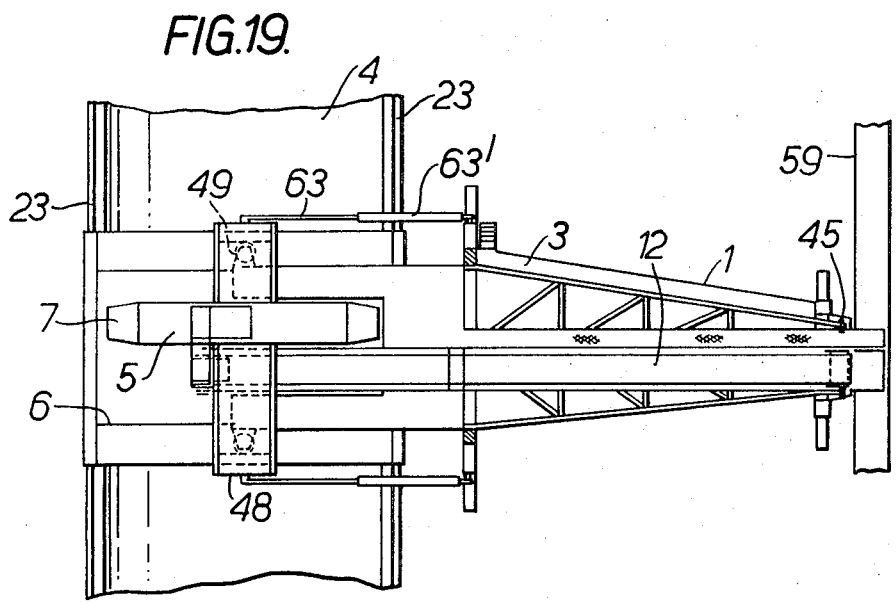

FIG. 19 is a view looking at the direction indicated by the arrow XIX of FIG. 2.

Referring to FIG. 1, a scoop or scraping apparatus generally designated by 2 comprises a plurality of buckets 7 carried by a bucket wheel 5 which in turn is carried by a bucket wheel supporting frame 6 having wheels 8. The scoop or scraping apparatus is vertically movably supported by hoisting ropes 22 extending from a hoist winch 9 mounted upon an unloader structure 1 and wrapping around a sheave 19 fixed to the top end of a boom-like structure of the unloader structure 1 and around sheaves fixed to the supporting frame 6. The wheels 8 of the supporting frame 6 ride over rails 23 laid on both sides of a barge 4 so that the scoop apparatus 2 is movable along the axis of the barge 4.

The bucket wheel 5 rotates about an axis in parallel with the axis of the barge 4 or a freighter and is movable in the longitudinal direction of the barge 4 when the unloader structure 1 travels alongside the wharf 50. The cross section of the bottom of the barge 4 is made similar to the traveling path of the buckets 7 carried by the bucket wheel 5.

The other end of the hoisting rope 22 is fixed through a sheave 21 fixed to the rear portion of the unloader structure 1, to a weight 15 whose weight is slightly less than that of the scoop apparatus 2. The upward movement beyond a predetermined level of the weight 15 is prevented by a stopper 16 attached to the rear portion of the unloader structure 1.

FIG. 14 illustrates another embodiment of the present invention which are hoisted by a plurality of independent hoisting ropes 22 whose one ends are securely fixed to the hoisting drum 10. The hoisting ropes 22 are extended through the sheave 19 at the upper end of the unloader structure 1 and their the other ends are securely fixed to the scoop apparatus 2. Another rope 22' whose one end is securely fixed to the hoisting drum 10 and which is coiled around the hoisting drum 10 in the opposite direction of the hoisting ropes 22, is extending backwardly through the sheave 21 and the other end of this rope 22' is securely fixed the weight 15 whose weight is slightly less than that of the scoop apparatus 2. By the hoisting drum 10, the scoop apparatus 2 may be hoisted or lowered. The hoisting drum 10 is coupled to its drive mechanism through a clutch so that the hoisting drum 10 may rotate freely when there is a difference in tension between the hoisting ropes 22 and the rope 22' during the unloading operation. The hoisting drum 10 is also provided with a brake which may be released during the unloading operation. Means for preventing the upward movement in excess of a predetermined level of the weight 15 is provided so that the brake is applied by this safeguarding means so as to retard the hoisting drum 10.

Guide rails 26 and 27 are fixed to the outermost beam 24 and to the next inner beam 25 of the supporting frame 6 respectively so that a flanged vertical rollers 28 of a sloping harrow 17 may ride between the rails 26 and 27. The harrow 17 may reciprocate in the directions at a right angle to the direction of the advancement of the supporting frame 6 through a connecting rod 31 which is connected to a crank 29 of a prime mover 30 or hydraulic cylinder 30'. The harrow 17 includes scraping needles 33 for scraping bulk materials 32 and thrust rollers 34 in order that the guide rails 26 may receive the reaction caused by pushing the sloping surface of the bulk materials 32 by the harrow 17.

Referring to FIGS. 11 to 13, guide holes 35 and 36 are drilled through the supporting frame 6 on the side of the hoisting side of the bucket wheel 5. The lower ends of guide frames 37 and 38 fitted into these holes 35 and 36 are joined to a carriage frame 39 having rollers 40 and 41. A guard plate 18 is movably fixed to the carriage frame 39 and one end of a hoisting rope 43 coiled around the hoisting device 42 is fixed to the guard plate 18 so that it may be vertically moved. A guide plate 44 is fixed to the carriage frame 39 so that the deviation of the supporting frame 6 relative to the barge 4 may be compensated.

Referring back to FIG. 1, the discharge end of the rear conveyor 13 in a girder 3 is above a land transportation machinery 59 such as a conveyor belt and the loading end of the rear conveyor 13 is opposed to the discharge end of the front conveyor 14 through a shoot 60. The loading end of the front conveyor 14 is supported upon the scoop apparatus 2 through a pin 61. The discharge side of the conveyor 14 is hoisted by a wire rope 62 from the girder 3 so that the discharge end of the front conveyor 14 may be moved relative to the loading side of the rear conveyor 13.

In the unloading machinery shown in FIG. 2, the rear end of the conveyor girder 3 is pivotably fixed by a pin 45 to the unloader structure 1 so as to be inclined. A roller 46 is fixed to the underside of the loading end of the conveyor girder 3. The roller 46 rides over a rail 47 upon the supporting frame 6. A horizontal roller 49 is fixed to each side of the loading end of the conveyor girder 3 so as to be in contact with the inner side of the inner frame 48, whereby the inner frame 48 may be pushed in the direction of the axis of the barge 4 by the rollers 49.

In the unloading machinery illustrated in FIGS. 15 and 16, wire ropes 51, 52, 53 and 54 are rotatably fixed to the four corners of the supporting frame 6 respectively and are wrapped over the sheaves 55, 56, 57 and 58 respectively at the top of the unloader structure 1 and coiled around the hoist drum 10 mounted upon the unloader structure 1.

Referring back to FIG. 2, a rod or plunger 63 of a hydraulic cylinder 63' is extending between the unloader structure 1 and the inner frame 48 of the supporting frame 6, thereby connecting the unloader structure 1 to the supporting frame 6. Therefore, the rod 63 is extended or retracted by the hydraulic cylinder 63' and furthermore the rod 63 is freely extended or retracted when the hydraulic cylinder 63' is not actuated. Reference numeral 64 designates a shoot for loading upon the conveyors 12 and 14 the bulk materials scraped and hoisted by the buckets 7; and 65, bulk materials piled.

Figure 3:
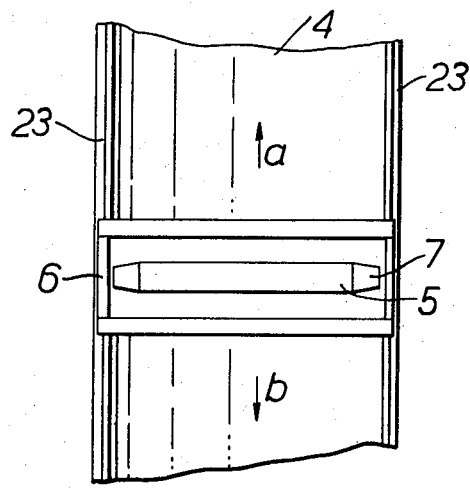
FIG. 3 is a top view thereof.

When the scoop apparatus 2 is traveled in the axial direction along the rails 23 with the bucket wheel 5 rotating, the bulk materials are sequentially scraped by the buckets 7 and transported by the conveyor 12 or 14 and 13 toward the land transportation machinery 59. The unloading operation can be accomplished by the scoop apparatus 2 in both directions indicated by the arrows a and b in FIG. 3, the unloading operation can be very efficiently accomplished without wasting time.

When the cross section of the bottom of the barge 4, all of the bulk materials in the barge 4 may be unloaded at high speed in an extremely simple manner, thereby enhancing the unloading efficiency.

Figure 4:
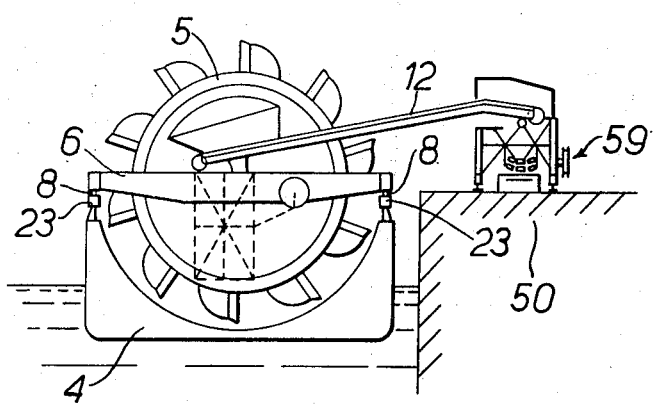
FIG. 4 is for explanation of the mode of mounting of the scoop apparatus thereof directly upon the vessel without the use of hoisting ropes for unloading.
Figure 5:
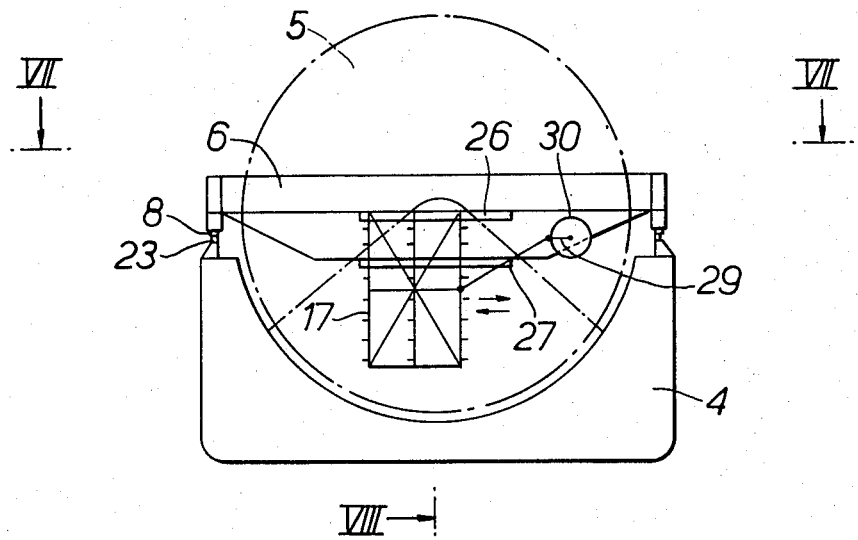
FIG. 5 is a front view illustrating the relation between the harrow and the scoop apparatus thereof.
Figure 6:
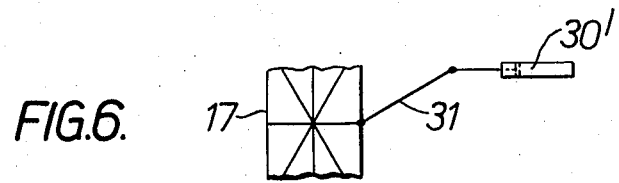
FIG. 6 is a diagrammatic view illustrating the connection between the harrow and a hydraulic cylinder.
Figure 7:
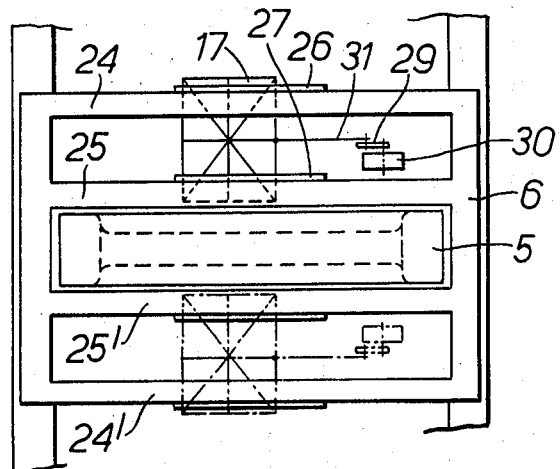
FIG. 7 is a top view looking in the direction of the line VII—VII of FIG. 5.
Figure 8:
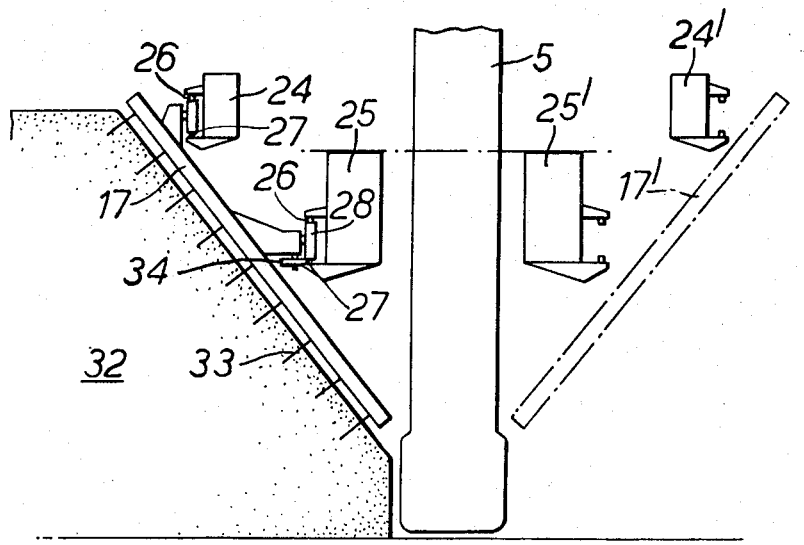
FIG. 8 is a fragmentary sectional view, on enlarged scale, taken along the line VIII—VIII of FIG. 5.
Figure 9:
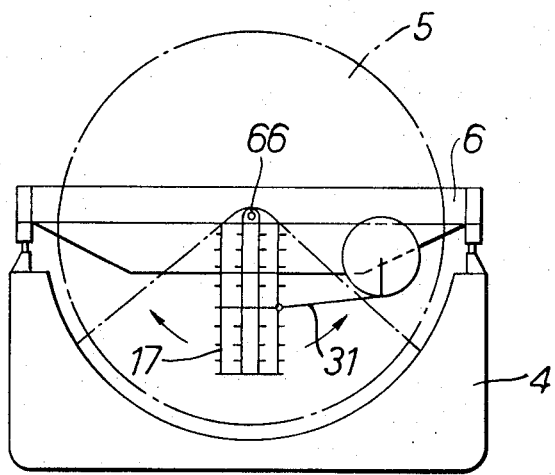
FIG. 9 is a front view of another embodiment of an unloader in accordance with the present invention.

The upper portion of the piled bulk material 32 can be harrowed and supplied to the scoop apparatus 2 so that the bulk materials can be scooped over the whole cross section of the barge hopper of a vessel. The harrow 17 carried by the supporting frame 6 on one side thereof reciprocates as described with reference to FIGS. 4 to 6. When the upper end of the harrow 17 is pivotably fixed to the center 66 of the supporting frame 6 as shown in FIG. 9, the harrow 1 may be rotated about the center 66 by the prime mover 30 through the connecting rod 31. Furthermore, as shown in FIGS. 7 and 8, on both sides of the supporting frame 6 are carried harrows 17 and 17' through the beams 24, 24', 25 and 25' so that the bulk materials may be harrowed in both directions.

The complete scraping and unloading of the bulk materials can be ensured even before the scoop apparatus 2 rides over the rails 23 because of the provision of the guard plate 18. Furthermore, even when the vessel or barge 4 trims, rolls, pitches or yokes by the wind and waves, the scoop apparatus 2 can be accurately rode over the rails 23 because the guard plate 18 serves as a guide.

When the rope 22 is wound around the hoisting drum 10, first the weight 15 is raised, but since its upward movement is prevented by the stopper 16, when the rope 22 is further wound around the hoisting drum 10, the scoop 2 is gradually hoisted. When the force is acting upon the scoop apparatus 2 upwardly so that the scoop apparatus 2 is caused to move upwardly, the weight 15 serves to take up the slacking of the rope 22 so that no slacking of the rope 22 is caused.

When the scoop apparatus 2 rides over the rails 23 upon the vessel or barge 4, the weight difference between the scoop apparatus 2 and the weight of the bulk materials scooped act upon the vessel so that no desired weight acts upon the vessel. Even when the distance between the sheaves 19 and 20 is varied because of the movement of the vessel, the tension of the rope 22 may be always maintained at a constant value because the weight 15 moves upwardly or downwardly.

In the unloading machinery illustrated in FIG. 14, the driving force equivalent to the difference in weight between the weights of the scoop apparatus 2 and the weight 15 is applied to the hoisting drum 10 when the scoop apparatus 2 is hoisted. When the scoop apparatus 2 is mounted upon the vessel and the unloading is carried out with the hoisting drum disengaged from its drive device by disconnecting the clutch or the like, only the weight difference between the weights of the scoop apparatus 2 and the weight 15 and the weight of the bulk materials scooped act upon the vessel. The tension of the rope 22 may be maintained always at a constant value by the vertical movement of the weight 15 even when the vessel moves vertically and laterally.

In the unloading machinery as illustrated in FIGS. 15 and 16 where the wire ropes 51, 52, 53 and 54 form the triangles with the supporting frame 6, when the supporting frame 6 is raised or lowered by driving the hoisting drum 10, the angle $\alpha$ formed by the ropes is varied. But the frame 6 is always supported by the two ropes 51 and 52 or 53 and 54 which form a triangle with the frame 6 so that the weight of the scoop apparatus 2 including the bucket wheel 5 and the supporting frame 6 resists the rotary reaction force $\beta$ acting upon the bucket wheel 5 due to the scraping action thereof. Therefore, the unloading machinery can sufficiently resist the rotary reaction force without providing special links or wire ropes.

The discharging end of the conveyor girder 3 is supported by the pin 45 upon the unloader structure 1 while the loading end is supported upon the supporting frame 6 through the roller 46 so that the loading end of the conveyor girder 3 can follow the vertical displacement of the supporting frame 6. The horizontal rollers 49 are fixed to both sides of the loading end of the conveyor girder 3 in such a manner that the rollers 49 are made in contact with the inner side of the frame 6, so that when the unloader structure 1 travels, the thrust is applied to the frame 6 through the horizontal rollers 49, whereby the scoop apparatus 2 including the supporting frame 6 and the bucket wheel 5 may be walked or displaced together with the unloader structure 1.

Thus, it is seen that the bucket wheel 5 may be always mounted upon the barge 4 and the conveyor 12 or 14 can follow smoothly the rolling or trim of the barge 4 so that the bucket wheel 4 may be always maintained in a normal relation with the land transportation machinery conveyor 59. Therefore, the bulk materials scraped and hoisted by the buckets 7 may be unloaded toward the land transportation machinery 59 through the shoot 64 and the conveyor 12 or 14 and 13 in an accurate manner. Since only a fraction of weights of the bucket wheel and the conveyor acts upon the barge 4, the load of the vessel will not be decreased, opposed to the case in which the whole unloading machinery is mounted upon the vessel.

As shown in FIGS. 1, 17 and 18, the front and rear conveyors 14 and 13 are carried by the conveyor girder 3 in such a manner that the discharge end of the front conveyor is in opposed relation with the loading end of the rear conveyor 13 through the shoot 60. Therefore, by the pin 45 and the hoisting wire rope 62 of the front conveyor 14, the conveyor girder 3 may automatically follow the position of the vessel which is varied by rolling, trim and leaving from the wharf. The variation in distance between the discharge end of the front conveyor 14 and the loading end of the rear conveyor 13 can be compensated by the provision of the shoot 60. Therefore the unloading can be accomplished smoothly all the time.

As shown in FIG. 2, the bucket wheel supporting frame 6 is connected to the unloader structure 1 through the hydraulic cylinder and piston assembly 63' and its plunger or rod 63 so that the displacement of the bucket wheel supporting frame 6 by the scraping reaction force of the bucket wheel 5 can be prevented before the supporting frame 6 rides over the rails 23 upon the barge 4. Furthermore the fine adjustment of the lateral position of the supporting frame 6 can be accomplished when the supporting frame 6 is finally rode over the rails 23 upon the barge 4. Since the rod 63 is not actuated by the hydraulic cylinder and piston assembly 63' during the unloading operation, the bucket wheel can smoothly follow the positional change of the vessel.

The following advantages can be accrued from the unloading machine in accordance with the present invention:

I. The bucket wheel which rotates at a right angle relative to the axis of a vessel or barge can move along this axis so that the unloading of bulk materials can be accomplished in either directions, thereby remarkably improving the unloading efficiency. When the bottom of the vessel or barge is so formed as to conform with the path of the buckets carried by the bucket wheel, all of the bulk materials can be smoothly scraped.

II. The harrow 17 is provided so that even a large quantity of bulk materials in the vessel or barge can be harrowed slantingly relative to the bucket wheel axis and forwardly thereof. The bulk materials are thus smoothly supplied toward the bucket wheel and scraped and hoisted at a uniform speed. Furthermore the overflow of the bulk materials from the buckets of the bucket wheel due to the sliding of the piled bulk materials can be prevented. The spillage of the bulk materials into the outboard of the vessel can be prevented.

III. Since the guard plate 18 is provided, the spillage of the bulk materials can be prevented even when the vessel moves.

IV. Even when the relative position of the bucket elevator or bucket wheel with respect to the unloader structure is varied, the unloading conveyor can follow this variation. The bucket wheel can be hoisted when the unloading operation is interrupted. When the unloading operation is started, the bucket wheel is suspended from the unloader structure and is so lowered as to ride over the rails upon the vessel or barge. Therefore, irrespective of the movement of the vessel due to the rolling, trim, etc. and of the tide, the unloading operation can be carried out. Only a part of the unloader is mounted upon the vessel, the load of the vessel will not be decreased.

V. A weight which weighs slightly less than the scoop apparatus is used for producing the force for lifting the scoop apparatus during the unloading operation so that the heavy weight of the scoop apparatus is not directly applied upon the vessel and the hoisting wire ropes will not be slacked even when the vessel moves vertically and laterally.

VI. The hoisting ropes extending from the sheaves at the top of the unloader structure form triangles with the bucket wheel or bucket elevator supporting frame so that the supporting frame can sufficiently resist the reaction force caused by the scraping of the bucket wheel or elevator.

VII. When only one conveyor is carried in the conveyor girder, the conveyor girder is slidably mounted upon the bucket wheel supporting frame. When the conveyor girder has two separate conveyors, the shoot 60 is interposed between the loading end of the rear conveyor 13 and the discharge or unloading end of the front conveyor 14 so that the vessel can be communicated with the land transportation machinery smoothly even when the vessel moves or trims.

The present invention has been so far described with particular reference to the preferred illustrative embodiments thereof, but it will be understood that variations and modifications can be effected without departing from the true spirit of the present invention as described hereinabove with reference to the accompanying drawing and as defined in the appended claims.

What is claimed is:

1. An unloading apparatus for unloading bulk material from a water borne vessel moored alongside a wharf, said apparatus comprising a gantry structure means for moving said gantry structure longitudinally along a wharf, a trolley having support wheels positioned to permit movement of the trolley longitudinally with respect to the wharf, trolley hoist means for suspending said trolley from said gantry structure alongside said wharf, said gantry structure including means engaging said trolley for moving said trolley in said longitudinal direction, a bucket wheel mounted on said trolley for rotation about an axis parallel to said longitudinal direction, the axis of rotation of said bucket wheel being fixed with respect to said trolley, conveyor means mounted to transfer bulk materials from said bucket wheel to said gantry structure and a harrow mounted adjacent said bucket wheel and reciprocable to move materials to be unloaded towards the conveyor.

2. A transportation and unloading system comprising, in combination, a vessel having a longitudinally extending goods carrying compartment of part-circular transverse cross section, longitudinally extending guide rails on said vessel, unloading apparatus comprising a gantry structure mounted for movement along a wharf, a boom projecting from the gantry beyond an edge of the wharf and movable with the gantry, a frame disposed generally normal to said wharf edge and suspended by cables secured at spaced locations on the frame and trained over guide means on the boom to a winch for controlled raising and lowering of said frame, a bucket wheel mounted on said frame for rotation about an axis parallel to said wharf edge, guide means on said frame engageable with the guide rails of said vessel for guiding the frame and bucket wheel for movement longitudinally of the vessel, said bucket wheel having an envelope of similar curvature to the transverse cross section of the goods carrying compartment of said vessel.

3. A transportation and unloading system comprising, in combination, a vessel having a longitudinally extending goods carrying compartment of part-circular transverse cross section, longitudinally extending guide rails on said vessel, unloading apparatus comprising a gantry structure mounted for movement along a wharf, a boom projecting from the gantry beyond an edge of the wharf and movable with the gantry, a frame disposed generally normal to said wharf edge and suspended by cables secured at spaced locations on the frame and trained over guide means on the boom to a winch, a bucket wheel mounted on said frame for rotation about an axis parallel to said wharf edge, guide means on said frame engageable with the guide rails of said vessel for guiding the frame and bucket wheel for movement longitudinally of the vessel, said bucket wheel having an envelope of similar curvature to the transverse cross section of the goods carrying compartment of said vessel and wherein said cables are secured at four spaced locations on the frame and are trained over pulley means on said boom whereby adjacent pairs of cables and a line between the points of securement of the cables to the frame to define triangles.

4. A transportation and unloading system comprising, in combination, a vessel having a longitudinally extending goods carrying compartment of part-circular transverse cross section, longitudinally extending guide rails on said vessel, unloading apparatus comprising a gantry structure mounted for movement along a wharf, a boom projecting from the gantry beyond an edge of the wharf and movable with the gantry, a frame disposed generally normal to said wharf edge and suspended by cables secured at spaced locations on the frame and trained over guide means on the boom to a winch, a bucket wheel mounted on said frame for rotation about an axis parallel to said wharf edge, guide means on said frame engageable with the guide rails of said vessel for guiding the frame and bucket wheel for movement longitudinally of the vessel, said bucket wheel having an envelope of similar curvature to the transverse cross section of the goods carrying compartment of said vessel and wherein harrow means are supported in said frame for movement generally transversely of the goods carrying compartment of the vessel to cause material to be unloaded to be moved towards the pick-up section of said bucket wheel.

5. A transportation and unloading system comprising, in combination, a vessel having a longitudinally extending goods carrying compartment of part-circular transverse cross section, longitudinally extending guide rails on said vessel, unloading apparatus comprising a gantry structure mounted for movement along a wharf, a boom projecting from the gantry beyond an edge of the wharf and movable with the gantry, a frame disposed generally normal to said wharf edge and suspended by cables secured at spaced locations on the frame and trained over guide means on the boom to a winch, a bucket wheel mounted on said frame for rotation about an axis parallel to said wharf edge, guide means on said frame engageable with the guide rails of said vessel for guiding the frame and bucket wheel for movement longitudinally of the vessel, said bucket wheel having an envelope of similar curvature to the transverse cross section of the goods carrying compartment of said vessel and comprising a harrow, means mounting the harrow for reciprocation transversely through the goods carrying compartment to move materials to be unloaded towards the conveyor.

6. Apparatus as claimed in claim 5 wherein the harrow is inclined inwardly and downwardly towards a pick-up section of the conveyor.

7. Apparatus as claimed in claim 5 wherein there are two harrows one on each side of the conveyor.

* * * * *